(12) United States Patent
Bazzaro et al.

(10) Patent No.: US 6,344,224 B1
(45) Date of Patent: Feb. 5, 2002

(54) FEED BODY FOR DOMESTIC ANIMALS

(75) Inventors: Gianni Bazzaro, Povoletto (IT); Thierry Martin, Gondreville (FR)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/674,203

(22) PCT Filed: Apr. 26, 1999

(86) PCT No.: PCT/EP99/03017

§ 371 Date: Mar. 1, 2001

§ 102(e) Date: Mar. 1, 2001

(87) PCT Pub. No.: WO99/56533

PCT Pub. Date: Nov. 11, 1999

(30) Foreign Application Priority Data

May 2, 1998 (EP) ............................................. 98108029

(51) Int. Cl.$^7$ ................................................ A01K 39/01
(52) U.S. Cl. .................. 426/89; 426/549; 426/516; 426/103; 426/629; 426/639; 426/661; 426/805; 119/51.03
(58) Field of Search ........................... 426/89, 103, 629, 426/639, 661, 805, 549, 516; 119/51.03

(56) References Cited

U.S. PATENT DOCUMENTS 4,437,432 A * 3/1984 Immeyer et al. .............. 119/18
5,699,752 A * 12/1997 Wilkins .................... 119/51.03

FOREIGN PATENT DOCUMENTS

| DE | 3502700 | 8/1985 |
| EP | 0 021 052 | 7/1981 |
| GB | 756828 | 9/1956 |
| GB | 2 210 245 A | 7/1989 |

* cited by examiner

*Primary Examiner*—Chhaya D. Sayala
(74) *Attorney, Agent, or Firm*—Winston & Strawn

(57) ABSTRACT

The present invention relates to a fully edible feed body for domestic animals, comprising a central core having an elongated shape and a substantially circular or square section, to which at least one layer of a seed-based mixture is glued, and in which the central core is obtained by extrusion cooking from a mixture based on water, flour, seeds and optionally sugar.

20 Claims, 2 Drawing Sheets

FEED BODY FOR DOMESTIC ANIMALS

Figure 1:
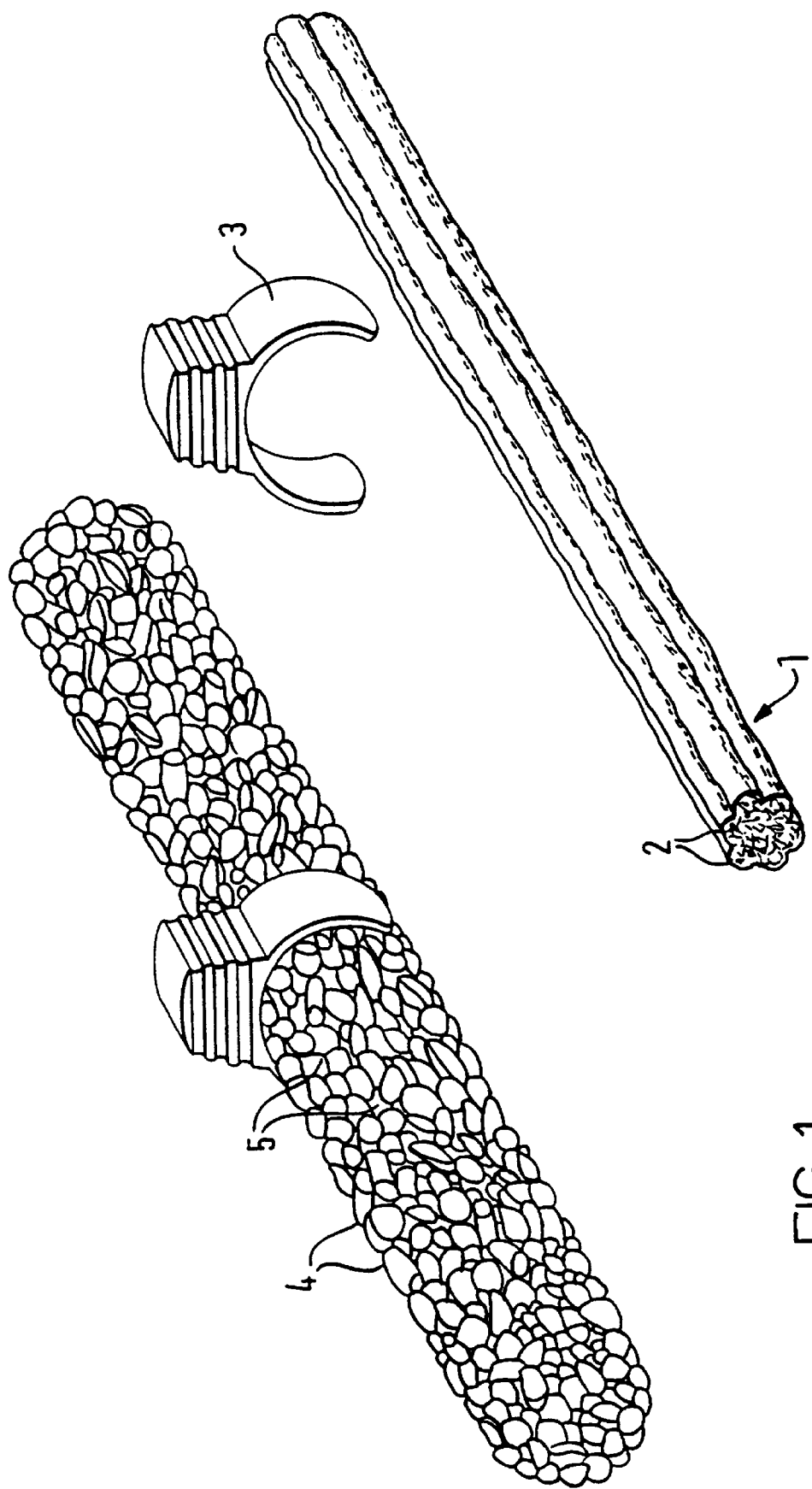

The present invention relates to a fully edible feed body for domestic animals.

Numerous feed bodies for domestic animals, in particular systems for birds, in which seeds are placed on a support which is not at all edible, are already commercially available. Patent DB 3502700, for example, relates to a feed body for birds comprising a wooden bar as support for the seeds.

The aim of the present invention is also to have a support, but said support is edible. This his the great advantage of minimizing wasting of material and of being able to add nutritive substances, for example mineral salts and vitamins.

The present Invention relates to a fully edible feed body for domestic animals, comprising a central core having an elongated shape and a substantially circular or square section, to which at least one layer of a seed-based mixture is glued, the said central core being obtained by extrusion cooking from a mixture based on water, flour, seeds and optionally sugar.

The central core should be rigid, so that the seeds can be applied to said support in a very uniform manner. This central core has a central or oval section with lobes, or is substantially square or rectangular. The type of flour in the central core is not critical, and wheat flour, cornflour or any other type of cereal flour is preferably used. Either a twin-bis [sic], or a single-screw, or any other system known in the state of the art and which makes it possible to carry out the desired extrusion cooking, is used as system for the extrusion cooking. The content of flour in the core is between 40 and 90% of the final core and the content of water is of the order of 2 to 11%. All the percentages in the present description are by weight.

The feed body according to the invention is especially intended for birds, although it is also possible to give it to rodents, such as guinea pigs, hamsters or rabbits. Birds are understood to mean both cage birds, such as parrots, canary birds and the like, and garden birds. In the case where it would be preferably considered for birds, it is preferable that the core also contains seeds so as to make the product attractive right to the end. The content of seeds is normally between 0 and 70%, preferably of the order of 50 to 60%. The type of seeds which can be used is not critical. Millet, wheat, oat, rape, canary grass, sorghum and sunflower seeds and the like are used for example. It is the same types of seed that are found in the layers of seeds around the central core.

The feed body according to the invention comprises, around the central core, a first layer of small-sized seeds and, on top, a second layer of larger-sized seeds. For rodents, it is also possible to have only one layer of seeds. It is also possible to envisage layers of medium sized seeds and/or layers of larger-sized seeds. Medium-sized seeds are understood to mean seeds having a mean particle size of 2 to 6 mm in diameter approximately. Larger-sized seeds are understood to mean seeds having a mean particle size of 6 to 8 mm in diameter approximately.

For the seeds to adhere well to the central core, they must be mixed with a glue. This glue is modified starch, for example modified corn or wheat starch. The glue may also contains colorings, vitamins or mineral salts, The ratio by weight of the core relative to the layers of seeds (glue included) is normally between 1:3 and 1:6. The ration by weight of seeds relative to the glue is between 1:1 and 1:2.

The layers of seeds may also contain pieces of dried fruit and of colored bread.

A completely edible feed for birds is thus available according to the invention. The final weight of said feed can be adjusted according to the size of the birds.

The present invention also relates to the method of manufacturing the feed body, in which an extrusion cooking of a mixture based on flour, water and optionally sugar is carried out, in a first stage, at a temperature greater than 200° C. and, in a second stage, at the time of addition of the seeds, the extrusion cooking is continued at a temperature of less than 180° C., the mature in extruded and the expanded product is out to the desired size, a glue layer is applied to each product, a layer of seeds is applied to the glue layer and the product is treated in a drying oven. It is also possible to apply a second glue layer, a second layer of seeds and a second drying. The temperatures mentioned in the present description correspond to the temperatures in the barrels of the extruder.

The temperature profile for the extrusion cooking is of the order of 150 to 240° C., namely a temperature greater than 200° C. in the first part of the extruder and a temperature of less than 180° C. in the second part of the extruder. The flour is truly introduced at the inlet of the extruder, while if seeds are added, they are added at the end of the extruder. The extruded and expanded product is cut to the desired size, for example cores are envisaged which have a length of the order of 10 to 20 cm. The cores then arrive on a conveyor belt onto which a quantity of glue is allowed to fall, then they pass over another conveyor belt onto which arrive the required quantity of seeds. The product finally passes into a drying oven and it is ready to be packaged.

Figure 2:
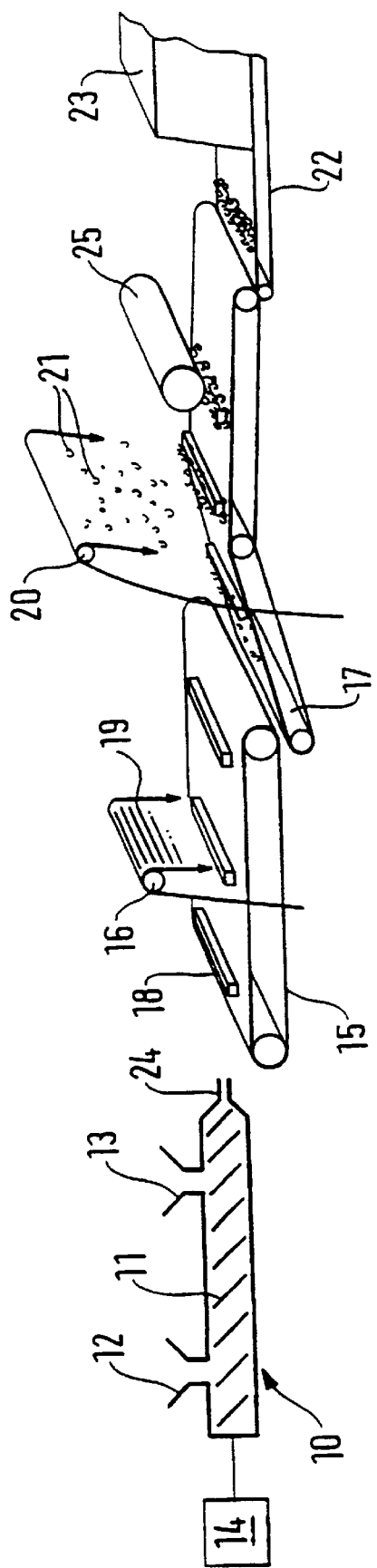

The remainder of the description is made with reference to the drawings in which FIG. 1 is a perspective view of the feed body according to the invention and FIG. 2 to a schematic representation of the device for the manufacture of the product according to the invention.

The central corn (1) has an elongated shape and a substantially circular section with lobes (2). It is coated with the seeds (4) which are in the present case seeds of various cereals. They have a particle size of the order of 2 to 8 mm, The glue (5) allows said seeds to remain well glued to the central core. The collar (3) holds the feed body and allows it to be attached to the grilles of the bird cage.

FIG. 2 represents the device for manufacturing the feed body according to the invention. The extruder (10) with a single-screw (11) has a hopper (12) for admitting flour and water and a hopper (13) for adding seeds. The screw (11) is driven by a motor (14). There is a conveyor belt (15) downstream with a system (16) for admitting glue. The next conveyor belt (17) conveys the central core (18) with the glue (19) to a system (20) for admitting a first layer of seeds (21). The conveyor belt (22) finally allows the passage of the feed body into the drying tunnel (23). The figure shows the application of a single layer of seeds. It is quite certain that to apply a second layer of seeds, the system with the conveyor belts simply has to be repeated (15, 17, 22).

The device works in the following manner: the motor (14) drives the screw (11) fed with the water, the flour, the seeds and optionally sugar. In the first part of the extruder, a temperature of the order of 220° C. exists and after the introduction of the seeds, the temperature is reduced to about 160° C. At the outlet (24) of the extruder, there is a cut in order to obtain the cores (18). The conveyor belt (15) conveys said core under a curtain of glue (19). The coating is uniform over the whole periphery of the core. The conveyor belt (17) then conveys the core with the glue under an admission of seeds (21). The curtain (25) allows a uniform distribution over the periphery of the core. Finally, the conveyor belt (22) allows arrival in the drying tunnel (23) working at a temperature of the order of 80° C.

The remainder of the description is made with reference to an example.

EXAMPLE

A mixture of 93%, of wheat flour with 7% of sugar is introduced into the extruder. This mixture is measured out in a proportion of 40% which is then mixed with 60% of seeds. These seeds are seeds of various cereals. A central core is taken out and cut in order to have a length of 14 cm having a weight of about 10 g. About 7 g of modified cornstarch is then allowed to fall over this core and finally 9 g of seeds having a particle size of the order of 2 to 6 mm.

Provision is then made for a second layer with 10 g of glue and 14 g of seeds having a particle size slightly greater than the preceding layer.

This product is given to parrots and it is observed that they truly consume it in its entirety, because the core has a good proportion of seeds.

What is claimed is:

1. An edible feed body for domestic animals, comprising:
   a central core having an elongated shape and comprising a mixture of flour and seeds;
   a first layer comprising seeds and disposed around the central core; and
   glue adhering the first layer around the central core.
2. The feed body of claim 1, wherein the glue is edible.
3. The feed body of claim 2, wherein the glue comprises modified starch.
4. The feed body of claim 1, further comprising:
   a second layer comprising seeds and disposed around the first layer; and
   glue adhering the second layer around the first layer.
5. The feed body of claim 4, wherein the seeds of the second layer have a mean size that is larger than the mean size of the seeds of the first layer.
6. The feed body of claim 1, wherein the central core comprises up to 70% seeds by weight.
7. The feed body of claim 1; wherein the feed body has a ratio by weight of seed to glue of between about 1:1 and 2:1.
8. The feed body of claim 1, wherein the first layer further comprises pieces of dried fruit or colored bread.
9. The feed body of claim 1, wherein the central core comprises sugar.
10. The feed body of claim 1, wherein the central core comprises an extrusion cooked mixture of the flour and seeds.
11. The feed body of claim 1, wherein the central core has a cross-section comprising lobes.
12. A method of producing an edible feed body for domestic animals, comprising:
    extrusion cooking a mixture comprising water, flour, and seeds to form an elongated central core; and
    gluing seeds onto the central core to form a first layer disposed thereon.
13. The method of claim 12, wherein the gluing of the first layer comprises coating glue on the central core and applying the first layer on the glue.
14. The method of claim 12, further comprising placing the central core with the glued first layer in a heat drying oven to affix the seeds to the core.
15. The method of claim 12, further comprising:
    coating the first layer with additional glue; and
    applying seeds to the additional glue to form a second layer of seeds upon the first layer.
16. The method of claim 12, wherein the extrusion cooking of the mixture comprises:
    extrusion cooking the water and flour of the mixture without the seeds at a first temperature;
    adding seeds to the mixture; and
    extrusion cooking the seed containing mixture at a second temperature that is lower than the first temperature.
17. The method of claim 16, wherein the first temperature is at least about 200° C., and the second temperature is below about 180° C.
18. The method of claim 12, wherein the mixture comprises sugar.
19. The method of claim 12, further comprising passing the central core with the applied glue and first layer by a curtain in contact therewith for controlling the distribution of the seeds around the core.
20. The method of claim 12, wherein the glue is edible.

* * * * *